United States Patent

Sastri et al.

[11] Patent Number: 5,965,268
[45] Date of Patent: Oct. 12, 1999

[54] CARBON-BASED COMPOSITES DERIVED FROM PHTHALONITRILE RESINS

[75] Inventors: Satya B. Sastri, Greenbelt, Md.; James P. Armistead, Fairfax; Teddy M. Keller, Fairfax Station, both of Va.

[73] Assignee: The United States of America as represented by the Secretary of the Navy, Washington, D.C.

[21] Appl. No.: 09/105,087

[22] Filed: Jun. 26, 1998

[51] Int. Cl.⁶ .................... B32B 9/00; C01B 31/08
[52] U.S. Cl. ................ 428/408; 428/366; 428/367; 428/378; 428/379; 428/446; 428/698; 428/699; 428/704; 428/908.8; 501/98; 501/99; 427/122; 252/502; 252/503; 264/29.7
[58] Field of Search ................... 428/408, 366, 428/367, 378, 379, 446, 698, 699, 704, 908.8; 501/98, 99; 427/122; 252/502, 503; 264/29.7

[56] References Cited

U.S. PATENT DOCUMENTS

| 4,408,035 | 10/1983 | Keller | 528/183 |
|---|---|---|---|
| 4,409,382 | 10/1983 | Keller | 528/173 |
| 4,587,325 | 5/1986 | Keller | 528/172 |
| 5,389,441 | 2/1995 | Keller | 428/395 |
| 5,645,219 | 7/1997 | Miks et al. | 239/265.11 |
| 5,686,027 | 11/1997 | Olsen et al. | 264/29.7 |
| 5,759,688 | 6/1998 | Lee et al. | 428/408 |

OTHER PUBLICATIONS

Buckley, John D. and Edie, Dan D., ed., *Carbon–Carbon Materials and Composites*, Noyes Publications, Park Ridge, NJ (1993), Chapter 5.

*Primary Examiner*—Richard Weisberger
*Attorney, Agent, or Firm*—Thomas E. McDonnell; Ralph T. Webb

[57] ABSTRACT

A carbon-based composite is made by the steps of (1) impregnating a fibrous material with a phthalonitrile thermoset polymer precursor, (2) curing the product of step (1) to form a fiber-reinforced thermoset polymer and (3) pyrolyzing the product of step (2) to form the carbon-based composite. The carbon-based composite may be made with only one cycle of the steps (1), (2), and (3).

19 Claims, No Drawings

CARBON-BASED COMPOSITES DERIVED FROM PHTHALONITRILE RESINS

BACKGROUND OF THE INVENTION

1. Field of the Invention

The invention relates to carbon-based composites, and in particular to carbon-based composites derived from phthalonitrile resins.

2. Description of the Related Art

Carbon-based composites are materials that are composed of a fibrous reinforcement in a carbonaceous or graphitic matrix. A filler or coating may also be included to impart specialized properties.

As used in this application, the term "carbon-based composite" refers generally to any composite having a fibrous reinforcement in a carbonaceous or graphitic matrix. The terms "carbon/carbon composite" or "carbon-carbon composite" refer to a carbon-based composite wherein the fibrous reinforcement comprises carbon fiber.

Carbon-carbon composites are lightweight materials, with densities ranging from about 1.36 to about 2.00 g/cm$^3$, depending on the precursors used for their production. Carbon-based composites may have greater density, depending on the density of the particular fibrous reinforcement used. Carbon-based composites possess great thermal stability in non-oxidizing environments and may be coated with an oxidation-resistant coating for use in oxidizing environments.

Typically, carbon-based composites are formed by impregnating a fibrous material with an organic resin and then heating or pyrolyzing the mixture to carbonizing temperatures. For carbon/carbon composites, the carbon fiber material is typically derived from polyacrylonitrile (PAN), rayon, or petroleum pitch. Silicon carbide, metal, glass or ceramic fibers may be used to fabricate other types of carbon-based composites.

First-generation matrix materials for carbon-based composites were derived from phenolic and phenolic-furfuryl alcohol resins. These resins have the disadvantage that when they are cured and pyrolyzed to form a carbon-based composite, they generate volatiles, which create voids in the composite. To eliminate the voids and to produce a carbon-based composite with an acceptable density, multiple steps of impregnation and carbonization are required. The process of making a carbon-based composite with these types of resins is therefore time-consuming and expensive. With some currently used carbon precursor materials, it can take 6 to 8 months of repeated impregnation and pyrolysis steps to make a thick, complex carbon/carbon structure. More recently, other materials such as liquid (mesophase) pitch have been used as the matrix material. These materials typically have a high viscosity, which makes the process of impregnating a fibrous material more difficult. Other processes such as chemical vapor deposition/chemical vapor infiltration (CVD/CVI) of volatile hydrocarbon compounds have been used to achieve higher densities. However, with chemical vapor methods, carbon tends to deposit preferentially on the surface of the fibrous material and a thorough penetration of a thick fiber matrix is difficult to achieve.

A variety of methods and materials for making carbon/carbon composites are described in numerous publications and patents including, for example, the following: Buckley, John D. and Edie, Dan D., ed., *Carbon-Carbon Materials and Composites,* Noyes Publications, Park Ridge, N.J. (1993); Delmonte, John, *Technology of Carbon and Graphite Fiber Composites,* Van Nostrand Reinhold Company, New York, N.Y. (1981); Schmidt et al, "Evolution of Carbon-Carbon Composites (CCC)" SAMPE Journal, Vol.32, No. 4, July/August 1996, pp 44–50; "Expanding Applications Reinforce the Value of Composites" High Performance Composites 1998 Sourcebook; U.S. Pat. No. 3,914,395 to Finelli, et al; U.S. Pat. No. 4,178,413 to DeMunda; U.S. Pat. No. 5,061,414 to Engle; U.S. Pat. No. 4,554,024 to Zimmer, et al; and U.S. Pat. No. 5,686,027 to Olsen, et al. All of the above patents and publications are incorporated herein by reference.

A method for making a silicon carbide fiber reinforced carbon composite is described in U.S. Pat. No. 5,759,688 to Lee et al, incorporated herein by reference.

Phthalonitrile monomers and resins have been used for making thermoset polymers. Phthalonitriles have the advantage that they are easily processed and can be cured without generating volatile by-products. Various phthalonitrile resins are described, for example, in U.S. Pat. No. 3,730,946, U.S. Pat. No. 3,763,210, U.S. Pat. No. 3,787,475, U.S. Pat. No. 3,869,499, U.S. Pat. No. 3,972,902, U.S. Pat. No. 4,209,458, U.S. Pat. No. 4,223,123, U.S. Pat. No. 4,226,801, U.S. Pat. No. 4,234,712, U.S. Pat. No. 4,238,601, U.S. Pat. No. 4,259,471, U.S. Pat. No. 4,304,896, U.S. Pat. No. 4,307,035, U.S. Pat. No. 4,315,093, U.S. Pat. No. 4,351,776, U.S. Pat. No. 4,408,035, U.S. Pat. No. 4,409,382, U.S. Pat. No. 4,410,676, U.S. Pat. No. 5,003,039, U.S. Pat. No. 5,003,078, U.S. Pat. No. 5,004,801, U.S. Pat. No. 5,132,396, U.S. Pat. No. 5,159,054, U.S. Pat. No. 5,202,414, U.S. Pat. No. 5,208,318, U.S. Pat. No. 5,237,045, U.S. Pat. No. 5,242,755, U.S. Pat. No. 5,247,060, U.S. Pat. No. 5,292,854, U.S. Pat. No. 5,304,625, U.S. Pat. No. 5,350,828, U.S. Pat. No. 5,352,760, U.S. Pat. No. 5,464,926, U.S. Patent Application by Satya B. Sastri and Teddy M. Keller for "FIBER-REINFORCED PHTHALONITRILE COMPOSITE CURED WITH LOW-REACTIVITY AROMATIC AMINE CURING AGENT" filed Oct. 2, 1997 and U.S. Patent Application by Satya B. Sastri and Teddy M. Keller for "PHTHALONITRILE THERMOSET POLYMERS AND COMPOSITES CURED WITH HALOGEN-CONTAINING AROMATIC AMINE CURING AGENTS" filed Oct. 2, 1997. All of these patents and applications are incorporated herein by reference.

U.S. Pat. No. 4,587,325, incorporated herein by reference, describes a conductive phthalonitrile polymer formed by heating a mixture of a diether-linked bisorthonitrile (phthalonitrile) monomer and an amine to a temperature above 450° C. U.S. Pat. No. 5,389,441, incorporated herein by reference, describes a fiber-reinforced composite formed by combining a fiber sized with a cured or partially cured phthalonitrile coating and a polymeric matrix. U.S. Pat. No. 5,645,219, incorporated herein by reference, describes the use of phthalonitrile resin as a matrix material in a fiber-reinforced ablative composite. The patent describes thermogravimetric testing of cured neat phthalonitrile resin samples by heating to 900° C. Methods of making fiber-reinforced thermoset composites based on phthalonitrile resins are described in Sastri et al, "Phthalonitrile-Carbon Fiber Composites" Polymer Composites, December 1996, Vol. 17, No. 6, pp 816–822 and Sastri et al "Phthalonitrile-Glass Fabric Composites", Polymer Composites, February 1997, Vol. 18, No. 1, pp 48–54, the disclosures of which are incorporated herein by reference.

SUMMARY OF THE INVENTION

It has now been discovered that carbon-based composites can be made by using phthalonitrile resins as precursors for forming the carbonaceous matrix material of the composite.

Accordingly, the present invention is directed to a method of making a carbon-based composite comprising the steps of
(1) impregnating a fibrous material with a phthalonitrile thermoset polymer precursor,
(2) curing the product of step (1) to form a fiber-reinforced thermoset polymer and
(3) pyrolyzing the product of step (2) to form the carbon-based composite.

In another aspect, the invention is directed to a carbon-based composite made by a process comprising the steps of
(1) impregnating a fibrous material with a phthalonitrile thermoset polymer precursor,
(2) curing the product of step (1) to form a fiber-reinforced thermoset polymer and
(3) pyrolyzing product of step (2) to form the carbon-based composite.

In another aspect, the invention is directed to a method of making a carbon/carbon composite comprising the steps of
(1) impregnating a carbon fiber material with a phthalonitrile thermoset polymer precursor,
(2) curing the product of step (1) to form a fiber-reinforced thermoset polymer and
(3) pyrolyzing the product of step (2) to form the carbon/carbon composite.

In another aspect the invention is directed to a carbon/carbon composite made by a process comprising the steps of
(1) impregnating a carbon fiber material with a phthalonitrile thermoset polymer precursor,
(2) curing the product of step (1) to form a fiber-reinforced thermoset polymer and
(3) pyrolyzing product of step (2) to form the carbon/carbon composite.

By using phthalonitrile resins as precursors for forming the carbonaceous matrix material of a carbon-based composite or a carbon/carbon composite, it is possible to make a dense, void-free composite in a single cycle of impregnation, cure and pyrolysis. Multiple steps of impregnation, cure and pyrolysis that are necessary with other resin systems to achieve an acceptable density are not required.

DETAILED DESCRIPTION OF THE PREFERRED EMBODIMENT

The present invention relates to a carbon-based composite and a method of making the composite by the steps of (1) impregnating a fibrous material with a phthalonitrile thermoset polymer precursor, (2) curing the product of step (1) to form a fiber-reinforced thermoset polymer and (3) pyrolyzing the product of step (2) to form the carbon-based composite.

As used herein, the term "phthalonitrile thermoset polymer precursor" refers to any material or mixture that may be cured to form a phthalonitrile thermoset polymer. Included in this definition, for example, are phthalonitrile monomers, mixtures of different phthalonitrile monomers, mixtures of phthalonitrile monomers and one or more curing agents, and partially cured B-staged prepolymers.

The phthalonitrile monomer may be any phthalonitrile monomer, such as are described, for example, in U.S. Pat. No. 3,730,946, U.S. Pat. No. 3,763,210, U.S. Pat. No. 3,787,475, U.S. Pat. No. 3,869,499, U.S. Pat. No. 3,972,902, U.S. Pat. No. 4,209,458, U.S. Pat. No. 4,223,123, U.S. Pat. No. 4,226,801, U.S. Pat. No. 4,234,712, U.S. Pat. No. 4,238,601, U.S. Pat. No. 4,259,471, U.S. Pat. No. 4,304,896, U.S. Pat. No. 4,307,035, U.S. Pat. No. 4,315,093, U.S. Pat. No. 4,351,776, U.S. Pat. No. 4,408,035, U.S. Pat. No. 4,409,382, U.S. Pat. No. 4,410,676, U.S. Pat. No. 5,003,039, U.S. Pat. No. 5,003,078, U.S. Pat. No. 5,004,801, U.S. Pat. No. 5,132,396, U.S. Pat. No. 5,159,054, U.S. Pat. No. 5,202,414, U.S. Pat. No. 5,208,318, U.S. Pat. No. 5,237,045, U.S. Pat. No. 5,242,755, U.S. Pat. No. 5,247,060, U.S. Pat. No. 5,292,854, U.S. Pat. No. 5,304,625, U.S. Pat. No. 5,350,828, U.S. Pat. No. 5,352,760, U.S. Pat. No. 5,464,926, U.S. Patent Application by Satya B. Sastri and Teddy M. Keller for "FIBER-REINFORCED PHTHALONITRILE COMPOSITE CURED WITH LOW-REACTIVITY AROMATIC AMINE CURING AGENT" filed Oct. 2, 1997 and U.S. Patent Application by Satya B. Sastri and Teddy M. Keller for "PHTHALONITRILE THERMOSET POLYMERS AND COMPOSITES CURED WITH HALOGEN-CONTAINING AROMATIC AMINE CURING AGENTS" filed Oct. 2, 1997. Preferably, the phthalonitrile monomer is a compound of the formula:

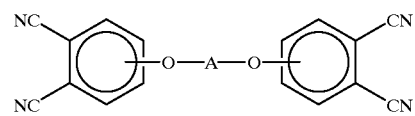

wherein A is any divalent organic radical. More preferably, A is selected from the group consisting of substituted or unsubstituted phenyl radicals, polyphenyl radicals, polyphenoxy radicals, fused aromatic poly-ring radicals and radicals of the general form —Ar—Z—Ar— where Ar is a substituted or unsubstituted aromatic group and Z is

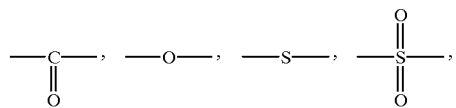

any alkylene of up to six carbon atoms, any halogenated alkylene of up to six carbon atoms, an imide-containing group or a connecting bond. By the word "substituted", it is meant that any known substituent could be attached to the aromatic moiety. Substituents include but are not limited to halogens, chalcogens, and organic radicals such as phenyl, alcohol, carboxyl, carbonyl, or aliphatic groups of less than 10 carbon atoms.

The curing agent may be any curing agent useful in promoting the polymerization of the phthalonitrile monomer under reactive conditions, such as temperatures above the melting point of the monomer. The curing agent should be stable and nonvolatile at elevated temperatures. Preferably, the curing agent is selected from the group of curing agents consisting of aromatic amines, phenols, inorganic acids, strong organic acids, metals, metallic salts and combinations thereof. Most preferably, the curing agent is an aromatic amine.

A B-staged prepolymer is made by partially polymerizing a phthalonitrile monomer or a mixture of monomers, preferably in the presence of a curing agent. Upon cooling, the B-staged prepolymer is typically a frangible solid which can be pulverized into a powder.

As used herein, the terms "fibers" and "fibrous material" are used interchangeably herein to refer to any type of reinforcing fiber useful in creating fiber-reinforced composites. Examples of useful fibers and fibrous materials are given in U.S. Pat No. 4,894,286 and U.S. Pat. No. 5,002,750, the entire disclosures of which are hereby incorporated herein by reference. Preferably, the fibers are carbon fibers or silicon carbide fibers. Carbon fibers are preferably fibers that are derived from polyacrylonitrile (PAN), rayon, or petroleum pitch. The fibers may also be metal, glass or ceramic.

The selection of a fibrous material for forming a carbon-based composite or carbon-carbon composite is influenced by the desired density for the final product. For example, fibrous material based on rayon typically has a density of about 1.42 g/cm$^3$, fibrous material based on polyacrylonitrile (PAN) typically has a density of about 1.76 to 1.94 g/cm$^3$, fibrous material based on mesophase petroleum pitch typically has a density of about 2.01 g/cm$^3$. The corresponding carbon-carbon composites have a density from about 1.36 to about 2.00 g/cm$^3$. Greater densities may be achieved by using inorganic fibrous material such as metal or glass fibers.

The fibrous material can be in any physical form useful in creating fiber-reinforced composites including, for example, woven fabrics, nonwoven mats, or tow. The fibrous material may be a fibrous preform with a shape corresponding to a particular desired end product.

The steps of impregnating the fibrous material with a phthalonitrile thermoset polymer precursor and of curing the mixture to form a fiber-reinforced thermoset polymer may by carried out by any method known in the art for creating fiber-reinforced thermoset polymers. In particular, conventional methods of prepreg consolidation, filament winding, resin transfer molding and resin infusion molding may be used. Techniques for making composite structures are described in numerous sources, including, for example, in the following patents and publications incorporated herein by reference: Sastri et al, "Phthalonitrile-Carbon Fiber Composites" Polymer Composites, December 1996, Vol. 17, No.6, pp 816–822; Sastri et al "Phthalonitrile-Glass Fabric Composites", Polymer Composites, February 1997, Vol.18, No.1, pp 48–54; Buckley, John D. and Edie, Dan D., ed., *Carbon-Carbon Materials and Composites,* Noyes Publications, Park Ridge, N.J. (1993); Delmonte, John, *Technology of Carbon and Graphite Fiber Composites,* Van Nostrand Reinhold Company, New York, N.Y. (1981); Schmidt et al, "Evolution of Carbon-Carbon Composites (CCC)" SAMPE Journal, Vol. 32, No. 4, July/August 1996, pp 44–50; "Expanding Applications Reinforce the Value of Composites" High Performance Composites 1998 Sourcebook; U.S. Pat. No. 3,914,395 to Finelli, et al; U.S. Pat. No. 4,178,413 to DeMunda; U.S. Pat. No. 5,061,414 to Engle; U.S. Pat. No. 4,554,024 to Zimmer, et al; and U.S. Pat. No. 5,686,027 to Olsen, et al, and U.S. Pat. No. 5,744,221 to Crane, et al. As used herein, the term "impregnating" a fibrous material means saturating the fibrous material with the phthalonitrile thermoset polymer precursor, such as is typically done in the conventional methods of resin transfer molding and resin infusion molding or other methods. Typically, the step of curing the mixture of the fibrous material and the phthalonitrile thermoset polymer precursor will include heating the mixture to a temperature at or below about 375° C.

The fiber-reinforced thermoset polymer is pyrolyzed to form the carbon-based composite by heating the fiber-reinforced thermoset polymer in an inert atmosphere for a sufficient time and at a sufficient temperature to carbonize the thermoset polymer. Preferably, the temperature range for the pyrolysis is between 450° C. and 1000° C., most preferably between 500° C. and 850° C. The length of time that the fiber-reinforced thermoset polymer is kept in the temperature range above 450° C. depends on the size and thickness of the polymer, and is preferably over 100 hours.

In making carbon-based composites, it is important to avoid creating defects or disruptions that may be caused by thermal stress or the evolution of volatiles during the pyrolyzing process. The evolution of volatiles is greatly reduced by the use of phthalonitriles as in the present invention, but can be reduced still further by controlling the heating rate of the fiber-reinforced thermoset polymer in the temperature range above 400° C. Thermal stress, which is caused by a difference in the coefficient of thermal expansion between the thermoset polymer and the fibrous material is also reduced by controlling the heating rate. Preferably, the heating above 400° C. is carried out at a rate of less than 20° C./min, most preferably at a rate of less than 1° C./min.

The steps of impregnation, cure and pyrolysis may be carried out as a single continuous process, for example, by impregnating the fibrous material with the phthalonitrile thermoset polymer precursor while heating the mixture up through the temperature range where curing occurs and then continuing to heat the mixture up to the temperature range where carbonization occurs. Alternatively, the method of the invention may be carried out in distinct stages. For example, a two-dimensional fibrous material may be impregnated with the phthalonitrile thermoset polymer precursor to form a prepreg which can be stored for later use. Then subsequently, prepregs may be stacked to form a laminate and heated to curing and carbonizing temperatures.

An important feature of the present invention is that a carbon-based composite having an acceptable density for structural applications and having no visible voids may be created by carrying out only one cycle of the steps of impregnation, cure and pyrolysis. Multiple steps of impregnation, cure and pyrolysis such as are required when other resin systems are used (see, for example, Buckley et al, supra, pp 9–11, which describes repeated cycles of impregnation and carbonization), are not necessary when a phthalonitrile thermoset polymer precursor is used.

Having described the invention, the following examples are given to illustrate specific applications of the invention, including the best mode now known to perform the invention. These specific examples are not intended to limit the scope of the invention described in this application.

EXAMPLES

Example 1

Formation of phthalonitrile composite from 4,4'-bis (3,4-dicyanophenoxy)biphenyl monomer, an amine catalyst and unidirectional IM7-carbon fiber 4,4'-Bis(3,4-dicyanophenoxy)biphenyl monomer (1000 g, 2.27 moles) was melted at 275° C. in a 2000 ml reaction kettle equipped with a mechanical stirrer. The temperature was lowered to 265° C. and 1,3-bis(3-aminophenoxy) benzene (21 g, 0.072 mole) was added in small quantities with vigorous stirring. After 15 minutes of reaction time, the melt was quenched to room temperature to obtain a B-staged phthalonitrile resin or a prepolymer. The prepolymer was powdered finely and used in the solution impregnation process to formulate a phthalonitrile/carbon prepreg. Unsized Hercules IM7-12K carbon fiber with a density of 1.77 g/cc was used to make a unidirectional tape with 37 weight % resin. A composite panel was fabricated by consolidation of eight plies of the prepreg (9"×11") in an autoclave by heating for 1 hour at 250° C. and 3 hours at 325° C. under 200 psi pressure. The composite panel was postcured under an inert atmosphere of nitrogen for an additional 8 hours each at 325, 350 and 375° C. prior to carbonization.

Example 2

Formation of phthalonitrile composite from 4,4'-bis (3,4-dicyanophenoxy)biphenyl monomer, an amine catalyst and T-650/35 carbon fabric 4,4'-Bis(3,4-dicyanophenoxy)biphenyl monomer (1000 g, 2.27moles) was melted at 275° C. in a 2000 ml reaction kettle equipped with a mechanical stirrer. The temperature was lowered to 265° C. and 1,3-bis(3-aminophenoxy) benzene (18 g, 0.062 mole) was added in small quantities with vigorous stirring. After 15 minutes of reaction time, the melt was quenched to room temperature to obtain a B-staged phthalonitrile resin or a prepolymer. The prepolymer was powdered finely and used in composite processing by resin infusion method. Amoco T650/35, 8 harness satin weave carbon fabric with UC 309 sizing and a density of 1.77 g/cc was used. Eight plies of the fabric (6"×6") were stacked above 49 g of prepolymer distributed evenly on a 6"×6" glass weave. A composite panel was processed in an autoclave by heating for 1 hour at 250° C. and 3 hours at 325° C. under 200 psi pressure. The composite panel was post-cured under an inert atmosphere of nitrogen for an additional 8 hours each at 325, 350 and 375° C. prior to carbonization.

Example 3

Formation of neat resin sample based on 1,3 bis(3, 4-dicyanophenoxy)benzene and 1,3 bis(3-aminophenoxy)benzene as the curing agent 1,3 Bis(3,4-dicyanophenoxy)benzene (2.3 g, 6.2 mmoles) was melted in an aluminum planchet on a hot plate at 220° C. The melt was degassed for 2 hours at 220° C. and 0.044 g (0.15 mmole) of 1,3 bis(3-aminophenoxy)benzene (APB) was added to the melt with stirring. After a 15 minutes dwell at 220° C., the melt was degassed for an additional 10 minutes and quenched to room temperature. The sample was cured in an oven by heating at 260° C. for 12 hours, 325° C. for 12 hours, 350° C. for 8 hours and 375° C. for 8 hours under an inert atmosphere of argon.

Example 4

Formation of neat resin sample based on 1,3 bis(3, 4-dicyanophenoxy)benzene and bis[4-(4-aminophenoxy)phenyl]sulfone as the curing agent 1,3 Bis(3,4-dicyanophenoxy)benzene (2.3 g, 6.2 mmoles) was melted in an aluminum planchet on a hot plate at 220° C. The melt was degassed for 2 hours at 220° C. and 0.068 g (0.15 mmole) of bis[4-(4-aminophenoxy)phenyl]sulfone (BAPS) was added to the melt with stirring. After a 15 minutes dwell at 220° C., the melt was degassed for an additional 10 minutes and quenched to room temperature. The sample was cured in an oven by heating at 260° C. for 12 hours, 325° C. for 12 hours, 350° C. for 8 hours and 375° C. for 8 hours under an inert atmosphere of argon.

Example 5

Formation of neat resin sample based on 1,3 bis(3, 4-dicyanophenoxy)biphenyl and 1,3 bis(3-aminophenoxy)benzene as the curing agent 1,3 Bis(3,4-dicyanophenoxy)biphenyl (2.73 g, 6.2 mmoles) was melted in an aluminum planchet on a hot plate at 250° C. The melt was degassed for 2 hours at 250° C. and 0.044 g (0.15 mmole) of 1,3 bis(3-aminophenoxy)benzene (APB) was added to the melt with stirring. After a 15 minutes dwell at 250° C., the melt was degassed for an additional 10 minutes and quenched to room temperature. The sample was cured in an oven by heating at 260° C. for 12 hours, 325° C. for 12 hours, 350° C. for 8 hours and 375° C. for 8 hours under an inert atmosphere of argon.

Example 6

Formation of neat resin sample based on 2,2-bis[4-(3,4-dicyanophenoxy) phenyl]propane and 1,3 bis (3-aminophenoxy)benzene as the curing agent 2,2-Bis[4-(3,4-dicyanophenoxy)phenyl]propane (2.99 g, 6.2 mmoles) was melted in an aluminum planchet on a hot plate at 220° C. The melt was degassed for 2 hours at 220° C. and 0.044 g (0.15 mmole) of 1,3 bis(3-aminophenoxy) benzene (APB) was added to the melt with stirring. After a 15 minutes dwell at 220° C., the melt was degassed for an additional 10 minutes and quenched to room temperature. The sample was cured in an oven by heating at 260° C. for 12 hours, 325° C. for 12 hours, 350° C. for 8 hours and 375° C. for 8 hours under an inert atmosphere of argon.

Example 7

Carbonization

Phthalonitrile composite samples (1"×1") from examples 1 and 2, and small pieces (0.5–1 g) of neat resins from examples 3, 4, 5 and 6 were dried in a vacuum oven at 110° C. for 2 hours and cooled in a desiccator to record the initial weights. The samples were placed in a retort furnace and flushed with argon for 12 hours before the heating cycle began. The following heating program was used: (1) heat from 25 to 325° C. at 5° C./min, (2) hold at 325° C. for 1 hour, (3) heat from 325 to 850° C. over a period of 120 hours (0.07° C./min), (4) hold at 850° C. for 4 hours and (5) cool to room temperature at 1° C./min. The observed weight loss upon carbonization of neat resin samples in examples 3–6 were 25.1%, 25.4%, 23.3% and 20.3%, respectively. The unidirectional and fabric-based composite lost 9.0% and 7.4% weight, respectively. The densities of the pyrolyzed composite samples were determined by water displacement technique (ASTM D 792). The density of the IM7-based unidirectional composite is 1.65 g/cc and that of fabric-based composite is 1.60 g/cc. The density of the resultant carbon/carbon composite is highly dependent on the fiber density; therefore, higher density composites may be obtained through the use of pitch-based fibers that have a density of 2.01 g/cc (as opposed to 1.77 g/cc for IM7 and T-650 fibers).

Obviously, many modifications and variations of the present invention are possible in light of the above teachings. It is therefore to be understood that, within the scope of the appended claims, the invention may be practiced otherwise than as specifically described.

What is claimed is:

1. A method of making a carbon-based composite comprising the steps of
    (1) impregnating a fibrous material with a phthalonitrile thermoset polymer precursor,
    (2) curing the product of step (1) to form a fiber-reinforced thermoset polymer and
    (3) pyrolyzing the product of step (2) to form the carbon-based composite.

2. The method of claim 1 wherein said method comprises only one cycle of the steps (1), (2) and (3).

3. The method of claim 1 wherein the step (3) of pyrolyzing the product of step (2) is carried out by heating the product of step (2) at a temperature of between about 450° C. and about 1000° C. for a period of time sufficient to carbonize the fiber-reinforced thermoset polymer.

4. The method of claim 3 wherein the product of step (2) is kept at a temperature in the range of about 450° C. to about 1000° C. for at least 100 hours.

5. The method of claim 3 wherein the product of step (2) is heated at a rate of less than 20° C. per minute.

6. The method of claim 3 wherein the product of step (2) is heated at a rate of less than 1° C. per minute.

7. The method of claim 1 wherein the phthalonitrile thermoset polymer precursor is a mixture of a phthalonitrile monomer and a curing agent.

8. The method of claim 7 wherein the phthalonitrile monomer is a compound of the formula:

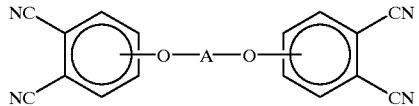

wherein A is a divalent organic radical.

9. The method of claim 8 wherein A is selected from the group consisting of substituted or unsubstituted phenyl radicals, polyphenyl radicals, polyphenoxy radicals, fused aromatic poly-ring radicals and radicals of the general form —Ar—Z—Ar— where Ar is a substituted or unsubstituted aromatic group and Z is

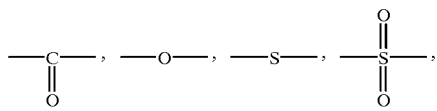

an alkylene of up to six carbon atoms, a halogenated alkylene of up to six carbon atoms, an imide-containing group or a connecting bond.

10. The method of claim 7 wherein the curing agent is selected from the group of curing agents consisting of aromatic amines, phenols, inorganic acids, strong organic acids, metals, metallic salts and combinations thereof.

11. The method of claim 1 wherein the phthalonitrile thermoset polymer precursor is a partially cured B-staged phthalonitrile prepolymer.

12. The method of claim 1 wherein the fibrous material comprises inorganic fibers selected from the group consisting of silicon carbide fibers, glass fibers, metal fibers and ceramic fibers.

13. A carbon-based composite made by a process comprising the steps of (1) impregnating a fibrous material with a phthalonitrile thermoset polymer precursor, (2) curing the product of step (1) to form a fiber-reinforced thermoset polymer and (3) pyrolyzing product of step (2) to form the carbon-based composite.

14. The carbon-based composite of claim 13, wherein said process comprises only one cycle of the steps (1), (2) and (3).

15. A method of making a carbon/carbon composite comprising the steps of (1) impregnating a carbon fiber material with a phthalonitrile thermoset polymer precursor, (2) curing the product of step (1) to form a fiber-reinforced thermoset polymer and (3) pyrolyzing the product of step (2) to form the carbon/carbon composite.

16. The method of claim 15 wherein said method comprises only one cycle of the steps (1), (2) and (3).

17. The method of claim 15 wherein the carbon fiber material is selected from the group consisting of fibers derived from polyacrylonitrile, fibers derived from rayon and fibers derived from petroleum pitch.

18. A carbon/carbon composite made by a process comprising the steps of (1) impregnating a carbon fiber material with a phthalonitrile thermoset polymer precursor, (2) curing the product of step (1) to form a fiber-reinforced thermoset polymer and (3) pyrolyzing product of step (2) to form the carbon/carbon composite.

19. The carbon/carbon composite of claim 18, wherein said process comprises only one cycle of the steps (1), (2) and (3).

* * * * *